United States Patent [19]

Asami et al.

[11] Patent Number: 5,775,761
[45] Date of Patent: Jul. 7, 1998

[54] HOLDER FOR SMALL ARTICLES PROVIDED IN A CEILING OF AN AUTOMOBILE

[75] Inventors: Goro Asami, Machida; Tomoo Eguchi, Utsunomiya; Osamu Takezawa, Wako; Yuji Saito, Wako; Hideyuki Abe, Wako, all of Japan

[73] Assignees: Honda Giken Kogyo Kabushiki Kaisha, Tokyo; Nifco Inc., Yokohama, both of Japan

[21] Appl. No.: 714,975

[22] Filed: Sep. 17, 1996

[30] Foreign Application Priority Data

Dec. 19, 1995 [JP] Japan ............................ 7-349306

[51] Int. Cl.⁶ ............................................ B60R 7/04
[52] U.S. Cl. .................. 296/37.7; 296/37.8; 224/282; 224/311; 312/248
[58] Field of Search ............... 296/37.1, 37.7, 296/37.8, 37.9; 224/282, 311; 312/248

[56] References Cited

U.S. PATENT DOCUMENTS

| 2,330,417 | 9/1943 | Gillisse et al. ............... 296/37.9 |
| 4,462,630 | 7/1984 | Omata ............................ 296/37.9 |
| 4,469,365 | 9/1984 | Marcus et al. ................ 296/37.7 |
| 4,838,599 | 6/1989 | Bruhnke et al. ........ 296/37.12 X |
| 4,925,072 | 5/1990 | Masler et al. ................ 296/37.9 |
| 5,050,922 | 9/1991 | Falcoff ...................... 256/37.8 X |
| 5,522,638 | 6/1996 | Falcoff et al. ................ 296/37.8 |

Primary Examiner—Dennis H. Pedder
Attorney, Agent, or Firm—Kanesaka & Takeuchi

[57] ABSTRACT

A holder for small articles of the invention is provided in a ceiling of an automobile. The holder is formed of a frame member fixed to the ceiling in a cabin of the automobile, and a movable member including a rotating shaft pivotally attached to the frame member, a lid portion for opening and closing an opening of the frame member, and a case portion provided at a rear side of the lid portion. When the lid portion is opened, an opening of the case portion is exposed in the cabin. A stopper projection is formed at a back portion of the case portion and has a projecting edge for defining an open position of the lid portion by engaging the frame member. The projecting edge is located on an imaginary circumferential line having a radius substantially equal to a length from a center of the rotating shaft to the opening edge of the lid portion.

9 Claims, 6 Drawing Sheets

HOLDER FOR SMALL ARTICLES PROVIDED IN A CEILING OF AN AUTOMOBILE

BACKGROUND OF THE INVENTION AND RELATED ART STATEMENT

The present invention relates to a holder for small articles, such as a pair of sunglasses, which is provided in a ceiling of a cabin of an automobile.

As a holder for small articles to be used by a driver in a driver's seat or a passenger in a passenger's seat, there are a glove compartment, a center console and the like. However, since the glove compartment and the center console are located outside a visual range in a forward direction of the driver while driving, when the driver tries to take out an article held therein while driving, the driver has to greatly move his or her eyes or gaze from the driving direction. Therefore, in case a pair of sunglasses is held in the glove compartment or center console, there is a disadvantage such that when the driver tries to take out the sunglasses while driving, the driver's attention in the forward direction is reduced.

Generally, as a holding place which does not obstruct driver's or passenger's action and from which the sunglasses or the like can be easily taken out by the driver in the driver's seat or the passenger in the passenger's seat by extending his or her hand, a space in a ceiling between right and left sun visors is considered. However, generally, since this portion is conspicuous, it is desirable that the holder is structured with a nice looking.

The present invention has been made to comply with the above requirement, and an object of the invention is to provide a holder for small articles disposed in a ceiling of an automobile, which is structured such that the holder can be housed in the ceiling when it is not used, and in case the holder is exposed to the outside when it is used, a space between an opening provided in the ceiling and the holder is not conspicuous.

SUMMARY OF THE INVENTION

In order to achieve the above object, in the invention, a holder for small articles provided in a ceiling of an automobile is formed of a frame member fixed to the ceiling in a cabin of the automobile; and a movable member pivoted to the frame member and including a lid portion for opening or closing an opening of the frame member, and a case portion integrally provided on a back side of the lid portion so that when the lid portion is opened, an opening thereof is exposed. A stopper projection is provided on a back side of the case portion to define the lid portion in an open position by engaging with the frame member. A projecting edge of the stopper projection is set to be located on an imaginary circumferential line having a radius substantially equal to a length from a center of a rotating shaft to an opening edge of the lid portion.

Also, a latch mechanism for holding the lid portion in a closing position is provided on one of a back side of the case portion and a back side of the frame member facing the back side of the case portion, and a projection piece to be engaged with the latch mechanism is provided on the other of the case portion and the frame member. In this case, the projection piece to be engaged with the latch mechanism extends from the back side of the case portion along a tangential direction of the imaginary circumferential line passing through the opening edge of the lid portion.

An elastic or spring device is arranged such that one end is engaged with the frame member and the other end is engaged with the case portion to thereby urge the lid portion in an open direction. The elastic device is a pair of compression coil springs, each coil spring being provided between an inner surface of a side wall of the frame member and an outer surface of a side wall of the case portion.

DETAILED DESCRIPTION OF PREFERRED EMBODIMENTS

Figure 1:
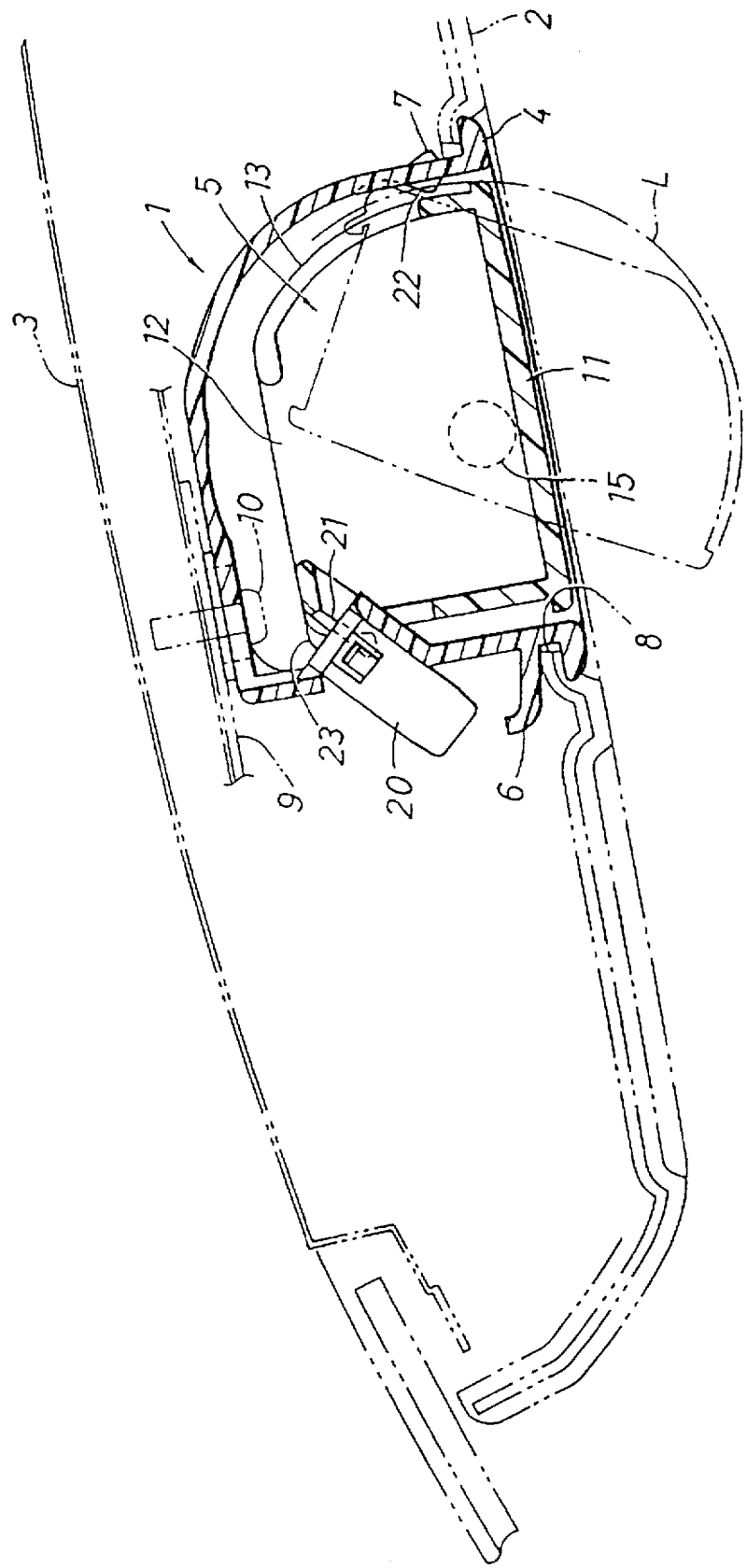
FIG. 1 is a sectional view of an eyeglasses holder provided in a ceiling of an automobile, which is cut at a center in a width direction of the automobile, according to the present invention.

FIGS. 1 to 4 show an eyeglasses holder 1 as an example of a holder for small articles provided in a ceiling of an automobile structured according to the present invention. The eyeglasses holder 1 is disposed at a central portion on a front side of the ceiling in the automobile, and is placed in a space between a ceiling lining 2 and a roof 3 of an automobile body. The eyeglasses holder 1 includes a frame member 4 fixed to an inner surface of the roof 3 of the automobile body, and a movable member 5 rotatably supported by the frame member 4 around a horizontal axis, as a center, extending in a width direction of the automobile.

The frame member 4 has a box shape having an opening at a lower surface, and is engaged with an inner circumferential edge of an opening 8 formed in the ceiling lining 2 by pawls 6 and 7 projecting from outer surfaces of front and rear walls thereof. The frame member 4 is also fixed to a base portion 9 provided at an inner surface of the roof 3 of the automobile body by tapping screws 10 or the like.

Figure 2:
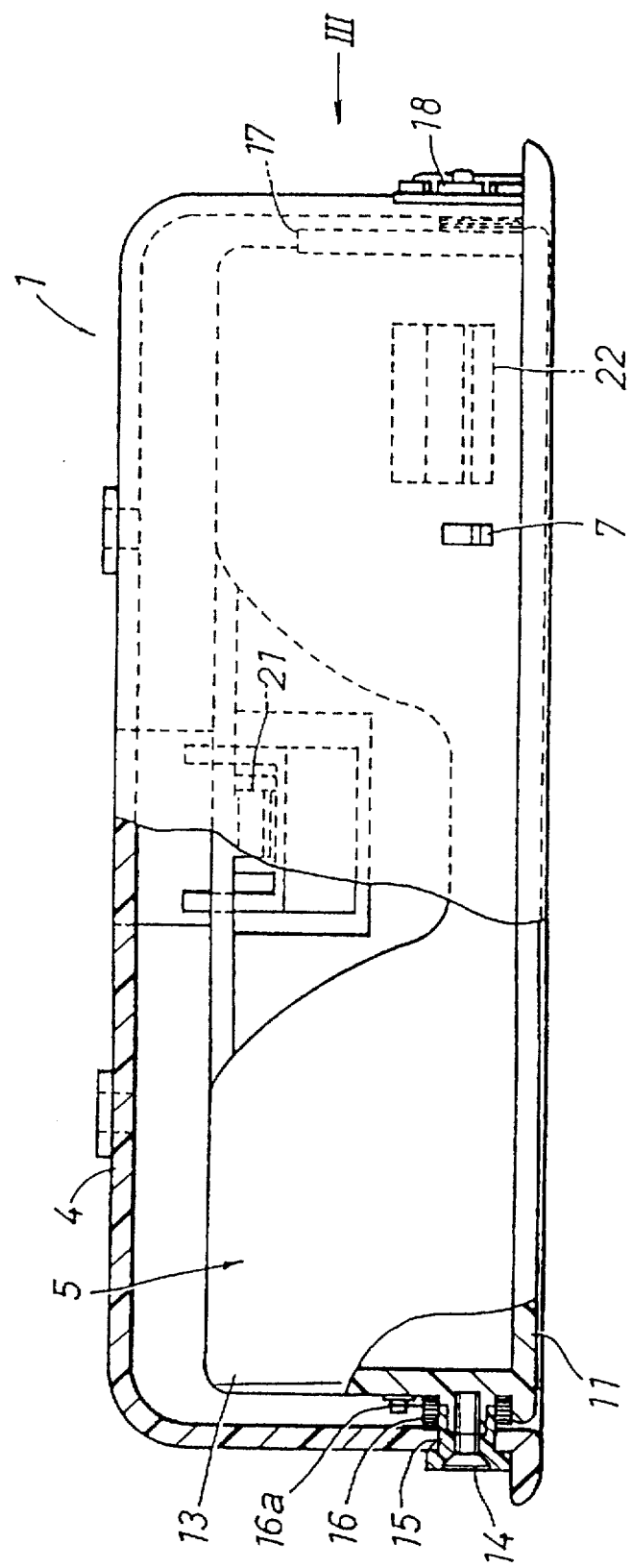
FIG. 2 is a back side view showing a partially cut eyeglasses holder according to the present invention.
Figure 3:
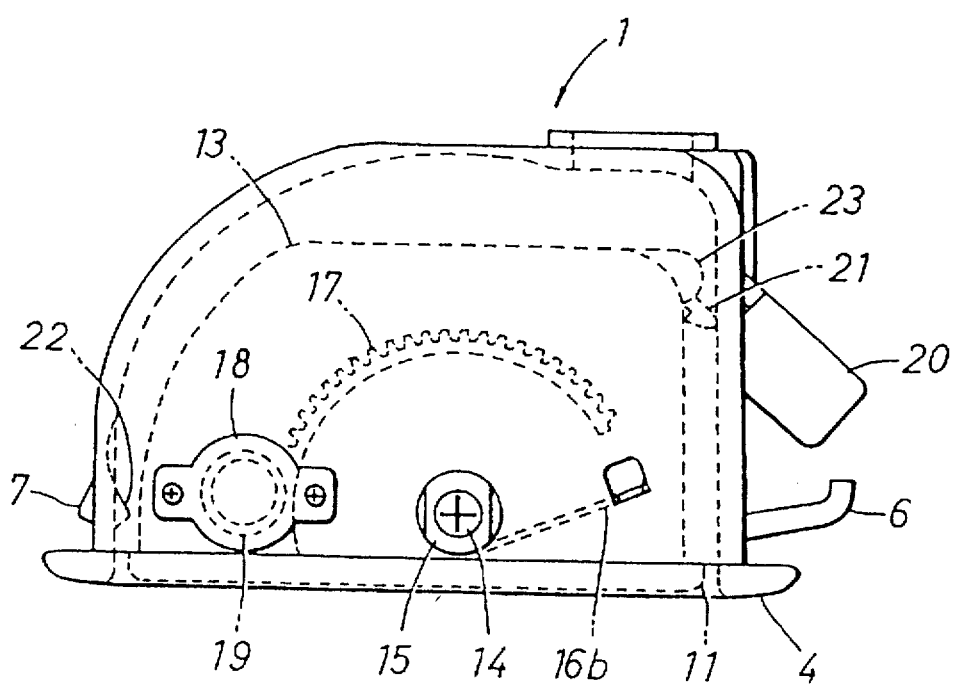
FIG. 3 is a view taken from a direction shown by an arrow III in FIG. 2.
Figure 4:
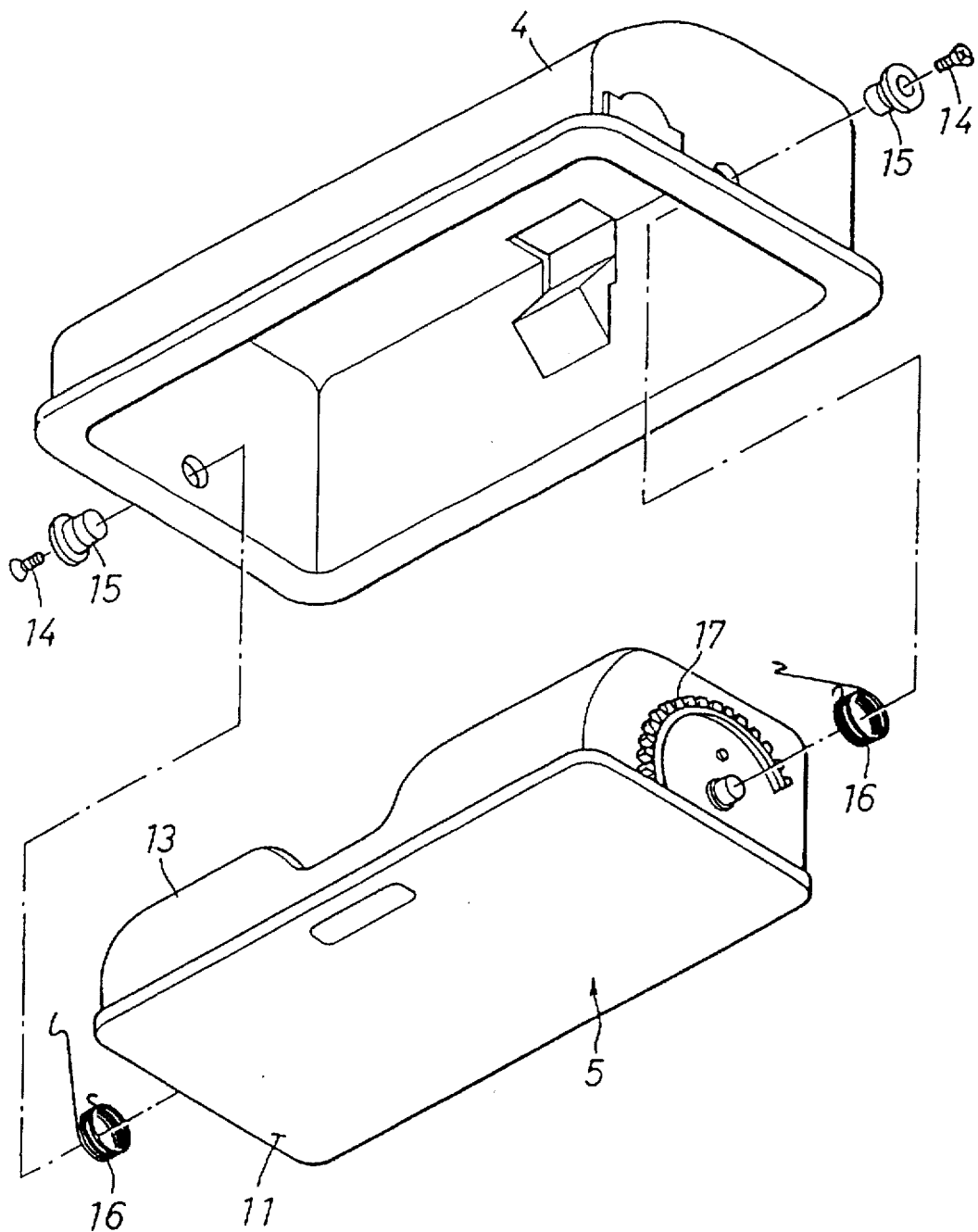
FIG. 4 is an exploded perspective view of the eyeglasses holder according to the present invention.

The movable member 5 includes a lid portion 11 which becomes substantially flush with an inner surface of the ceiling lining 2 when closing the opening at the lower surface of the frame member 4 in case the eyeglasses holder is not used; and a case portion 13, an opening 12 of which opens in a rear direction when the eyeglasses holder is used. The movable member 5 is pivoted to side walls of the frame member 4 by resin bushings 15, which are fixed to side plates of the case portion 13 by rivets 14, respectively. At left and right portions for pivoting the movable member 5 with respect to the frame member 4, i.e. around the resin bushings 15, a torsion coil spring 16 having one end 16a engaging an outer surface of a side plate of the case portion 13 as shown in FIG. 2, and the other end 16b engaging an inner surface of a side wall of the frame member 4 as shown in FIG. 3 is provided, respectively, so that the movable member 5 is always elastically urged toward an open direction. The torsion coil spring 16 is formed of a compressed coil spring for generating an elastic force in an expansion direction, and wobbling in an axial direction of the movable member 5 is prevented by the elastic force generated in the axial direction.

At an outer surface of one of the side plates of the case portion 13, a sector gear 17 is formed around the resin bushing 15 as a center. The sector gear 17 is engaged with a pinion 19 of a viscus resistance damper 18 provided on the side wall of the frame member 4. With this engagement, an appropriate resistance is applied to a rotating action in the open direction of the movable member 5 to thereby slowly open, so that at a time of opening of the movable member 5, articles held therein are prevented from shaking in the case portion 13.

Figure 5:
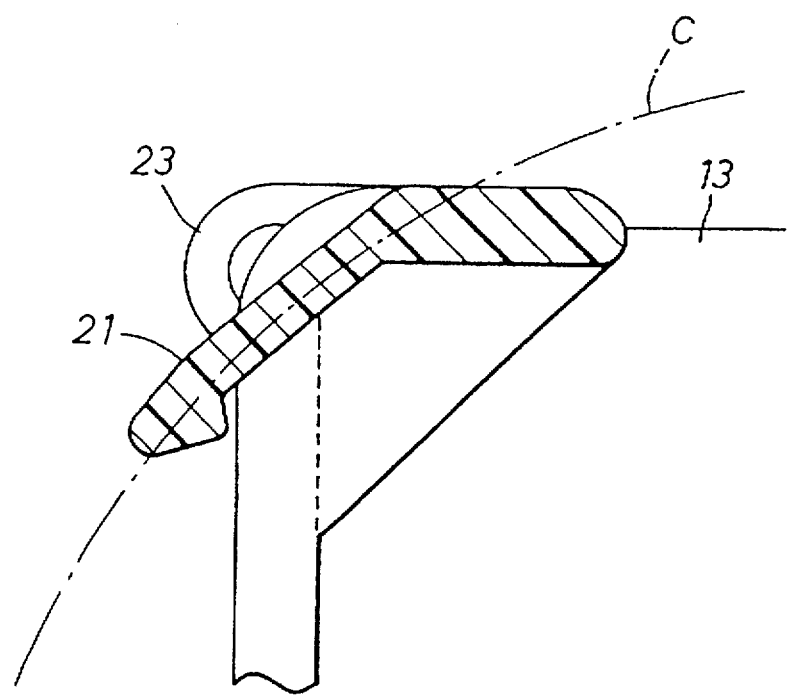
FIG. 5 is an enlarged sectional view of an essential part of the eyeglasses holder according to the present invention.

At a central portion of a front wall of the frame member 4, there is provided a latch mechanism 20 for holding the movable member 5 when it is not used. At a front plate of the case portion 13 of the movable member 5, i.e., a surface of the movable member 5 facing an inner surface of a front wall of the frame member 4, an engaging projection 21 to be engaged with the latch mechanism 20 is extended in a tangential direction with respect to an imaginary circular arc C around the resin bushing 15 as a center, as shown in FIG. 5. As described above, since the direction in which the engaging projection 21 extends is the tangential direction with respect to the circular arc C around the rotating shaft of the movable member 5 as the center, the length of the latch mechanism 20 projecting from a contour of the frame member 4 can be limited to a minimum value.

Incidentally, the latch mechanism 20 is an alternate type latch adopting a known heart cam. The latch mechanism 20 is engaged with the engaging projection 21 at a position where the lid portion 11 closes the opening of the frame member 4 to thereby hold or take an unusing state, and when an edge of the lid portion 11 at an opening side is pushed again in the closing direction, the latch mechanism 20 is released from an engagement with the engaging projection 21, so that the movable member 5 can be rotated. Also, in the present embodiment, the latch mechanism 20 is provided on the frame member 4, and the engaging projection 21 is located on the movable member 5. However, on the contrary, the latch mechanism 20 may be provided on the movable member 5, and the engaging projection 21 may be disposed on the frame member 4.

On both sides of the engaging projection 21, stopper projections 23 abutting against positioning projections 22 formed on an inner surface of a rear wall of the frame member 4 are provided. The stopper projections 23 abut against the positioning projections 22 to thereby define a rotation limit of the movable member 5. A position of a projecting edge of the stopper projection 23 extends slightly outwardly over an imaginary locus circle L of an opening edge of the lid portion 11.

In case the position of the projecting edge is set to extend more than the locus circle L of the opening edge of the lid portion 11, the frame member 4 has to be formed unnecessarily largely. Therefore, when the eyeglasses holder is not used, it is necessary to take a proper measure for filling up a space between the opening edge of the lid portion 11 and an inner circumferential edge of the frame member 4. On the contrary, in case the projecting edge is positioned inside the locus circle L, the positioning projection 22 on the inner surface of the rear wall of the frame member 4 has to be projected into an inner side of the case portion 13. Therefore, it is preferable that the position of the projecting edge of the stopper projection 23 is substantially equal to or slightly larger than a radius of the locus circle L of the opening edge of the lid portion 11 to thereby reduce the space between the frame member 4 and the lid portion 11.

Next, usage of the holder of the present invention is explained hereinbelow.

Figure 6:
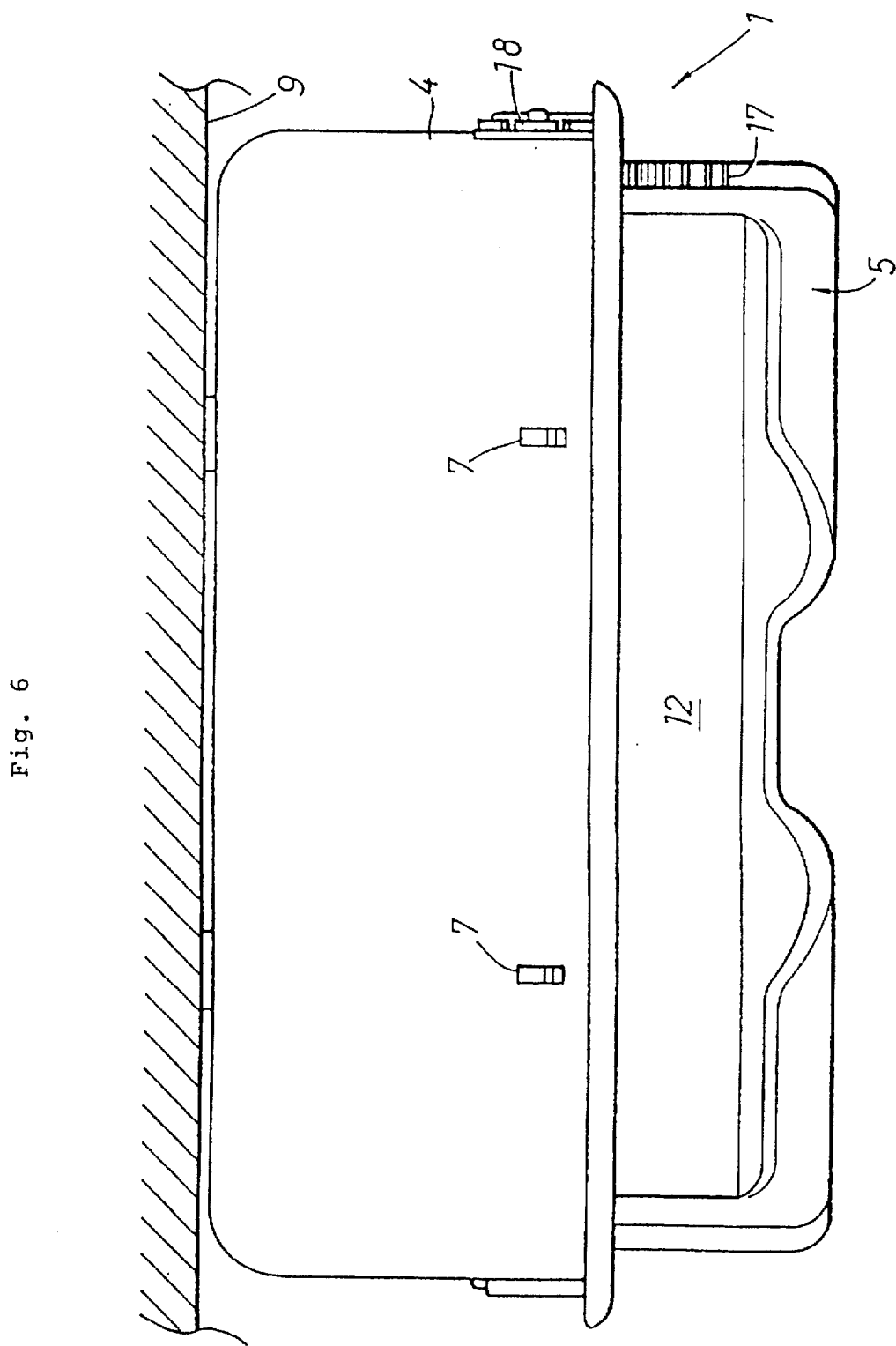
FIG. 6 is a back side view showing a using state of the eyeglasses holder according to the present invention.

As shown in FIGS. 1 to 3, usually, the engaging projection 21 is held by the latch mechanism 20, so that the opening of the frame member 4 is closed by the lid portion 11 to thereby hold or take the unusing state. In case the opening edge of the lid portion 11 is pushed upwardly, since the engaging projection 21 is released from the latch mechanism 20, the movable member 5 is rotated by an elastic force of the torsion coil spring 16, so that the opening 12 of the case portion 13 is exposed under a lower surface of the frame member 4, as shown in FIG. 6. In this state, a pair of eyeglasses horizontally held in the case portion 13 can be easily taken out from the opening 12 opened to a rear direction. When the opening edge of the lid portion 11 is pulled toward a user's side to thereby rotate the movable member 5 and fully push up the lid portion 11, the engaging projection 21 is engaged with the latch mechanism 20 to thereby take the unusing state.

As described herein above, according to the present invention, even when the holder is used as well as the holder is not used, the space between the frame member and the movable member can be made smaller. Therefore, the holder for small articles having excellent usability can be provided in a ceiling of an automobile without damaging an outer appearance.

What is claimed is:

1. A holder for small articles provided in a ceiling of an automobile comprising,
   a frame member fixed to the ceiling in a cabin of the automobile and having an opening,
   a movable member including a lid portion for opening and closing the opening of the frame member having an opening edge; and a case portion integrally provided at a rear side of the lid portion, said case portion having two opposing side walls, a back portion located between the side portions, and an opening situated away from the back portion so that when the lid portion is opened, the opening of the case portion is exposed in the cabin; and rotating shafts extending laterally outwardly from middle lower areas of the side walls and pivotally attached to the frame member to reduce an area of the movable member projecting downwardly from the frame member when the movable member is in an open position, and
   a stopper projection formed at the back portion of the case portion, said stopper projection having a projecting edge for defining the open position of the lid portion by engaging the frame member, said projecting edge being located on an imaginary circumferential line having a radius substantially equal to a length from a center of the rotating shafts to the opening edge of the lid portion.

2. A holder for small articles according to claim 1, further comprising a latch mechanism for holding a closing position of the lid portion provided at one of the back portion of the case portion and a portion of the frame member facing the back portion of the case portion, and a projection piece to be engaged with the latch mechanism provided at the other of the back portion and the portion of the frame member.

3. A holder for small articles according to claim 2, wherein said projection piece to be engaged with the latch mechanism extends from the back portion of the case portion along a tangential direction relative to an imaginary circular arc around the rotating shaft of the movable member.

4. A holder for small articles according to claim 1, further comprising a spring device having one end engaging the frame member and the other end engaging the case portion to thereby urge the movable member to an open direction.

5. A holder for small articles according to claim 4, wherein said spring device is a pair of compression coil springs, each coil spring being provided between an inner surface of a side wall of the frame member and an outer surface of a side wall of the case portion.

6. A holder for small articles according to claim 1, wherein said rotating shafts are pivoted onto the frame member so that when the movable member is entirely located in the frame member, the lid portion is substantially flush with a lining of the ceiling of the automobile, and when the movable member is rotated relative to the frame member and located in the open position, the opening of the case portion is located under the frame member and exposed in the cabin.

7. A holder for small articles according to claim 1, wherein said case portion further includes a curved retaining portion at a side opposite to the back portion, said opening of the case portion being located between the back portion and the curved retaining portion at a side opposite to the lid portion so that when the movable member is entirely located in the frame member in a closed position, the lid portion is substantially flush with a lining of the ceiling of the automobile, and when the movable member is rotated relative to the frame member to be located in the open position, the projecting edge of the stopper projection engages a positioning projection of the frame member located near an edge of the frame member and the opening of the case portion is substantially fully opened under the frame member to expose in the cabin.

8. A holder for small articles according to claim 7, wherein said lid portion of the movable member rotates more than 90 degrees relative to the frame member when the movable member is rotated from the closed position to the open position.

9. A holder for small articles according to claim 7, wherein said lid portion orients substantially horizontally in the closed position, and orients substantially vertically in the open position.

* * * * *